MEASUREMENTS SYSTEMS USING CONDUCTIVELY-HEATED PYROELECTRIC ELEMENT
Filed Sept. 22, 1967 2 Sheets-Sheet 1

Inventor
Jay E. Burton
By [signature]
Attorney

Inventor
Jay E. Burton
By [signature]
Attorney

United States Patent Office 3,519,924
Patented July 7, 1970

3,519,924
MEASUREMENTS SYSTEMS USING CONDUCTIVELY-HEATED PYROELECTRIC ELEMENT

Jay E. Burton, Fort Collins, Colo., assignor, by mesne assignments, to Heath Laboratories, Inc., Fort Collins, Colo., a corporation of Colorado Filed Sept. 22, 1967, Ser. No. 669,873
Int. Cl. H05b *1/00;* H01v *7/00;* G01n *27/00*
U.S. Cl. 324—71 18 Claims

ABSTRACT OF THE DISCLOSURE

A pyroelectric crystal is selectively responsive to signals at a predetermined temperature coefficient of selective-frequency change. A heating element is disposed essentially in thermally-conductive contact with the crystal. Signals are translated between the crystal and a signal device while electric power is translated between the heating element and a power unit. The crystal itself constitutes the primary frequency-determining element of an oscillator or a filter. In use either by itself or in association with a second crystal or other heat-sensitive element and through control of a power dissipated in the heating element, various different systems result which are useful in measuring such variables as power, voltage, fluid velocity, density, direction and pressure.

The present invention pertains generally to measurements systems. More particularly, it relates to heat-sensitive frequency-selective apparatus usable in such systems and to various combinations of such apparatus in those systems.

It is known that pyroelectric materials such as piezoelectric crystals exhibit mechanical activity in response to electrical signals of certain frequencies related to the dimensions and crystalligraphic orientation of the bodies. It also is recognized that the particular frequency or frequencies at which a piezoelectric body exhibits its response is subject to change as the temperature of the body itself changes. For this reason, when the piezoelectric body constitutes the primary frequency-determining element in a communications system, for example, the piezoelectric element often is housed within an oven in which the temperature is maintained accurately at a constant value. On the other hand, measurement systems have been devised to take advantage of the temperature-dependent frequency characteristic by using the piezoelectric device as a temperature sensor, incorporating the piezoelectric body as the frequency-determining element of an oscillator, and indicating the frequency of the oscillator by means calibrated in terms of temperature.

Numerous systems are known for determining velocity, direction, pressure and density of fluids and fluid flow. Similarly, a wide variety of apparatus exists for measuring electrical power and voltage. Still a host of other apparatus exists for measuring temperature and for use in such fields as calorimetry. However, with various differences in degree, such prior systems often suffer from one or more of poor efficiency, excessive response time, lack of adequate sensitivity, physical cumbersomeness and complexity or difficulty of electrical wiring requirements.

It is, accordingly, a general object of the present invention to provide new and improved measurement systems and apparatus therefor which overcome one or more of the aforenoted deficiencies.

It is another object of the present invention to provide new and improved heat-sensitive frequency-selective apparatus.

It is a further object of the present invention to provide apparatus and systems of the foregoing character and which include a pyroelectric body arranged in connection with other elements and components so as to exhibit a unique combination of control responses and effects.

Heat-sensitive frequency-selective apparatus in accordance with the present invention includes a body of pyroelectric material selectively responsive to signals at frequencies within a predetermined frequency range and exhibiting a predetermined temperature coefficient of selective-frequency change. A pair of electrodes are electrically affixed individually to respective spaced portions of the body, and a heating element is disposed essentially in thermally-conductive contact with the body. Means coupled across the electrodes translate the signals between the body and a signal device operative within the aforesaid frequency range. Electric power is translated between the heating element and a power unit.

The features of the present invention which are believed to be novel are set forth with particularity in the appended claims. The organization and manner of operation of the invention, together with further objects and advantages thereof, may best be uderstood by reference to the following description taken in connection with the accompanying drawing, in the several figures of which like reference numerals identify like elements, and in which:

Figure 1:
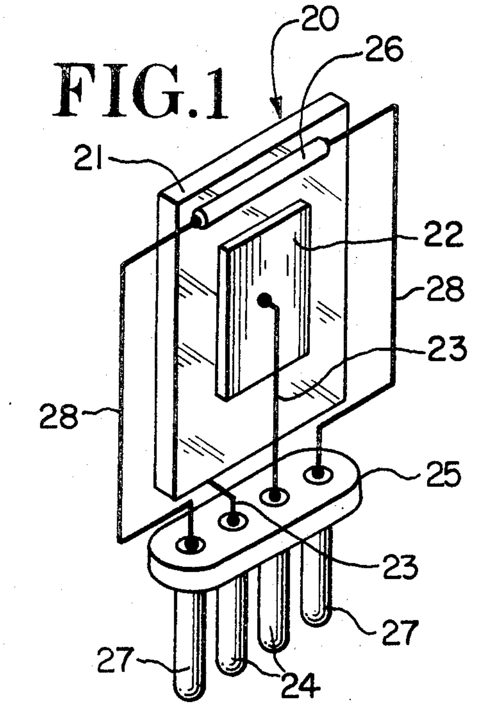
FIG. 1 is a perspective view of a piezoelectric crystal and heater unit.

As shown in FIG. 1 for purposes of illustrating the present invention, a crystal unit 20 is composed of a body 21 of piezoelectric material sandwiched between a pair of conductive electrodes 22 (one of which is on the back side of body 21). Electrically connected individually to respective ones of electrodes 22 are a pair of electrically conductive leads 23 which extend downwardly and into terminal pins 24 mounted in a base press 25 formed of an insulator material; leads 23 typically are soldered in pins 24.

FIG. 1 illustrates but one of a variety of known mounts or holders for a piezoelectric body in a crystal unit 20. In all such cases, electrodes 22 are electrically affixed to spaced portions of body 21 in the sense that there is interaction between an electric field established between the spaced electrodes and charge characteristics of the material of body 21. In practice, the electrodes may be metallic plates spring-pressed directly against the crystalline body, one of the plates may be spaced by a very small air gap from the adjacent surface of the body, the electrodes may instead be mechanically affixed rigidly to nodal points on the body which exist in certain modes of vibration, or, as a still further alternative, electrodes 22 may be composed of an electrically-conductive material electroplated or deposited directly upon the respective surfaces of body 21. All of these and other modes of mounting and making the necessary electrical connections to a crystal unit, as well as the choice which may be made from a variety of crystallographic orientations available to achieve a particular mode of vibratory action, are well known from basic text books, one example of which is Radio Engineering by Frederick Emmons Terman, 3rd edition, McGraw-Hill Book Company, Inc., New York, 1947, pages 418–432. Typically, piezoelectric body 21 is cut from a crystal of quartz, although other known piezoelectric materials, such as barium titanate, may be used. Moreover, as used herein, crystal body 21 is properly classed as a pyroelectric material. Other suitable pyroelectric materials are typified by lead zirconate-titanate which exhibits the desired effects very strongly. Nevertheless, for convenience hereinafter the material embodied will be exemplified as being of the piezoelectric species.

As is further illustrated in FIG. 1, a heating element 26 is disposed essentially in thermally-conductive contact with body 21, in this case being secured in direct physical contact with the body. Heating element 26 may be composed of any material which dissipates heat upon the passage of electric current therethrough and may be applied to body 21 by brushing, painting, electroplating, evaporation or by any other known bonding or gluing process. Typically, heating element 26 is a length of Nichrome wire affixed to a portion of the surface of body 21 by use of an epoxy glue. Electrically connecting opposite ends of heating element 26 respectively to individual ones of additional terminal pins 27, projecting from base press 25, are leads 28. As will be seen, in at least most cases, one of the leads 28 may be connected in common with one of the leads 23 in order to simplify fabrication. Still further, a single pair of leads from the crystal unit may serve to supply or derive both radio-frequency energy to or from electrodes 22 and heating power to or from element 26, the electrodes and the element being connected in parallel in the crystal unit. For example, radio-frequency energy may be coupled through D.C. blocking capacitors while a power source is coupled through radio-frequency chokes the input sides of which are by-passed to ground through capacitors.

Figure 2:
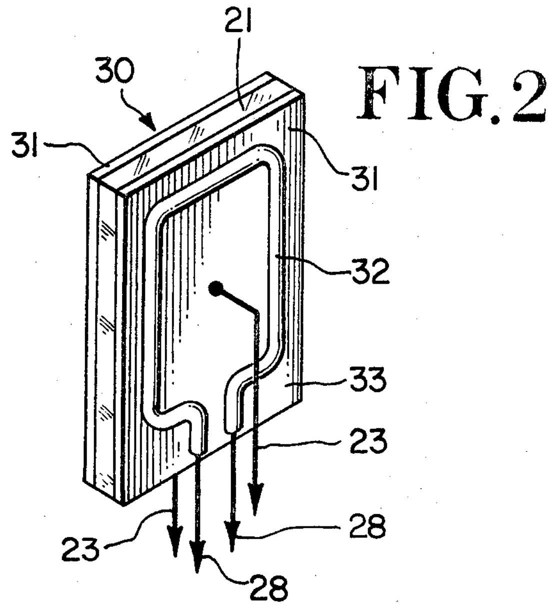
FIG. 2 is a perspective view of an alternative form of piezoelectric crystal and heater unit.

In a still different typical present-day form of construction, the piezoelectric body is in the shape of a disc having the signal electrodes disposed respectively against its opposing flat faces. In that case, as also may be done in the case of crystals having the shapes illustrated in FIGS. 1 and 2, the heater element advantageously is affixed to and around the peripheral surface of the disc.

Figure 3:
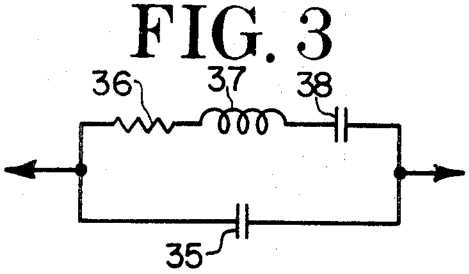
FIG. 3 is a schematic diagram of the circuit electrically equivalent to a piezoelectric crystal.

For signals impressed across its electrodes, a piezoelectric crystal is equivalent to the electrical circuit shown in FIG. 3. That equivalent circuit includes a capacitor 35 in parallel with the series combination of a resistor 36, and inductor 37 and a capacitor 38. Capacitor 35 represents the electrostatic capacitance between the electrodes adjacent to or on the crystal when it is not vibrating and the parallel series combination represents the equivalent of the vibrational characteristics of the crystalline material itself. That is, inductor 37 is the electrical equivalent of the crystal mass which is effective in the vibration, capacitor 32 is the electrical equivalent of the effective mechanical compliance of the crystal and resistor 36 represents the electrical equivalent of the mechanical friction involved. Consequently, for signal energy having a frequency in correspondence with that of the vibratory action arising out of the piezoelectric effect, the crystal units of FIGS. 1 and 2 constitute a frequency-selective element. Thus, the body of piezoelectric material is selectively responsive to signals at frequencies within a certain predetermined frequency range.

Figure 4:
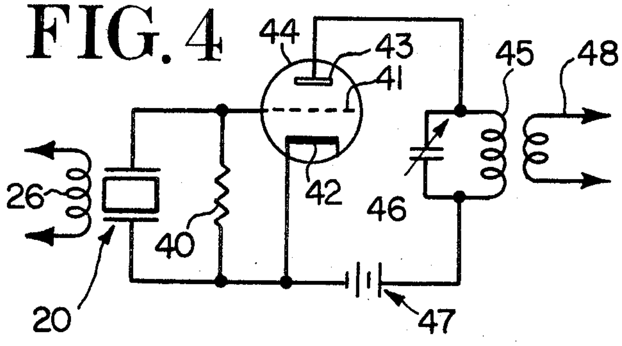
FIG. 4 is a schematic diagram of an oscillator circuit incorporating a crystal-heater unit which may be constructed like that shown in either of FIG. 1 or 2.

Piezoelectric crystal units in general typically find use as the primary frequency determining elements in oscillators. An exemplary oscillator circuit, as such, is shown in FIG. 4. In that circuit, crystal unit 20 (or unit 30) is paralleled by a grid resistor 40 and coupled between the grid 41 and cathode 42 of a triode electronic valve 43. Coupled between cathode 42 and the anode 44 of valve 43 is the plate tank network composed of the parallel combination of an inductor 45 and a capacitor 46, in this case connected in series with a D.C. power source 47 for the oscillator. Inductor 45 and capacitor 46 are selected, as by adjusting the capacitance of capacitor 46, to be resonant at a frequency selected and determined by crystal unit 20. Oscillatory signal energy developed by regeneration in the oscillator is derived by an output coil 48 inductively coupled to inductor 45.

Piezoelectric body 21 exhibits a predetermined temperature coefficient of selective-frequency change. That is, the frequency selected or determined by the piezoelectric unit is a function of the temperature of body 21. A change in temperature results in a change in frequency of oscillation of the circuit of FIG. 4, the amount of change and its direction depending upon the selection of the crystallographic axis, the dimensions involved and other parameters well known, per se, as discussed more fully in Radio Engineering, supra. With the crystal unit construction of FIGS. 1 and 2, the frequency of oscillation in the circuitry of FIG. 4 advantageously is quickly changed in response to a variation in the power fed to heater element 26. Adjustment of the level of that power constitutes a direct means of frequency control.

Another, use, known as such, for piezoelectric crystal units is in the construction of frequency-selective filters. Illustrative of such a filter is the circuit shown in FIG. 5 in which piezoelectric crystal unit 20 (or 30) is the principal frequency determining element. Coupled between input terminal 50 is a capacitor 51 in parallel with an inductor 52 in turn inductively coupled to a second inductor 53 paralleled by the series combination of a pair of capacitors 54 and 55 intermediate which is a connection to a plane of reference potential such as ground. Inductor 53 is coupled at one end to one electrode of unit 20 and at its other end through a variable capacitor 56 to the opposite electrode of unit 20. Coupled between that opposite electrode and ground is an inductor 57 in series with a variable resistor 58 with both of those components being paralleled by a capacitor 59. The output signal from the filter is derived from terminals 60 coupled across capacitor 59.

Figures 5, 6:
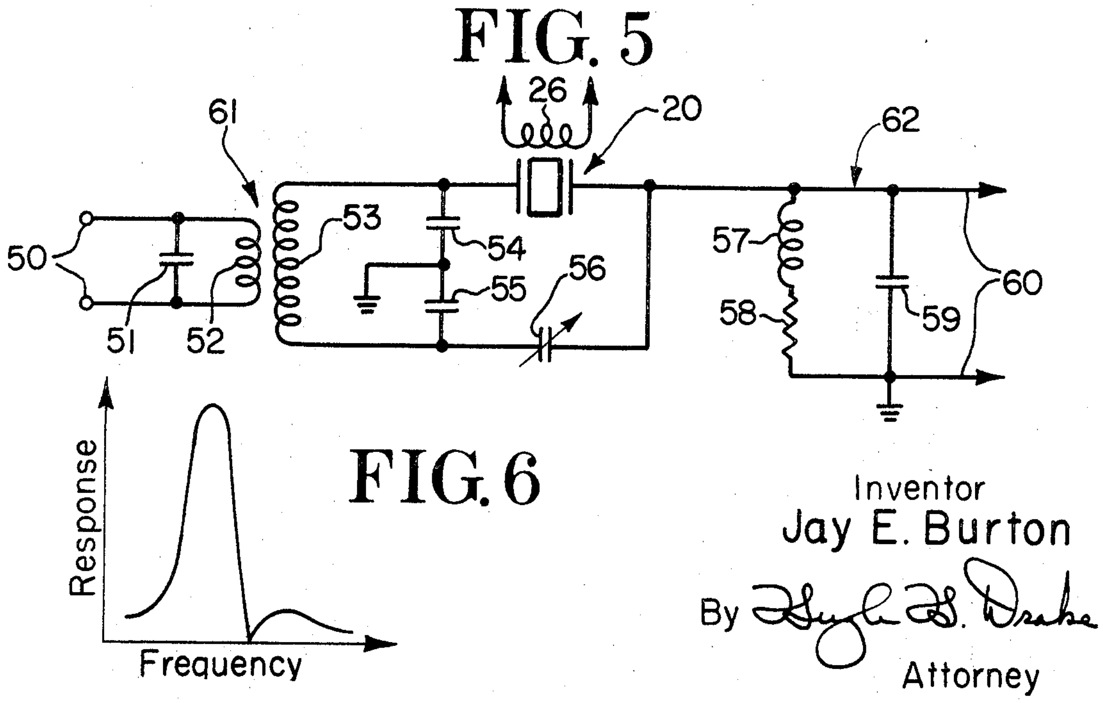
FIG. 5 is a schematic diagram of a filter incorporating a crystal-heater which may be constructed like that one shown in either of FIGS. 1 and 2.
FIG. 6 is a response curve useful in explaining the operation of the circuit of FIG. 5.

In essence, crystal unit 20 is employed as a coupling link between tuned input circuitry 61 composed of the first-described elements and a tuned output circuit 62 composed of components 57–59. Signal transmission as a function of frequency is represented in FIG. 6 wherein signal amplitude or response is represented along the ordinate and frequency along the abscissa. Maximum transmission through the filter occurs at the frequency for which crystal unit 20 is in series resonance (resonance of inductor 37 and capacitor 38 in the equivalent circuit of FIG. 3). On the other hand, the transmission level is substantially reduced at a slightly different frequency wherein the crystal unit is in parallel resonance. Selectivity of the circuit of FIG. 5 is adjusted by means of variable resistor 58, a high value of that resistor causing the selectivity to approach that of crystal unit 20 alone while a lower value of the resistance broadens the response curve. In this connection, tuned input and output circuits 61 and 62 generally exhibit a much broader response in terms of frequency than does the crystal unit. As indicated in FIG. 6, a point exists at a frequency higher than that of maximum response where the level of transmission is extremely low. The frequency at this point can be changed by varying the value of capacitor 56 which acts to neutralize the overall crystal capacitance (capacitor 35 in FIG. 3). In this manner, the sharpness of response on the high frequency side of the point of maximum response can be adjusted.

Because of the aforementioned temperature dependence of piezoelectric unit 20, a change in the power supplied to heater element 26 of but a small magnitude quickly results in a corresponding change in the frequency of maximum response exhibited by the crystal filter circuit. Consequently, for a signal of given frequency applied to input terminals 50, a significant change in amplitude of the output signal derived from terminals 60 is obtained rapidly upon an adjustment or variation in the level of power applied to heater element 26.

Figures 7, 8, 9, 10, 11:
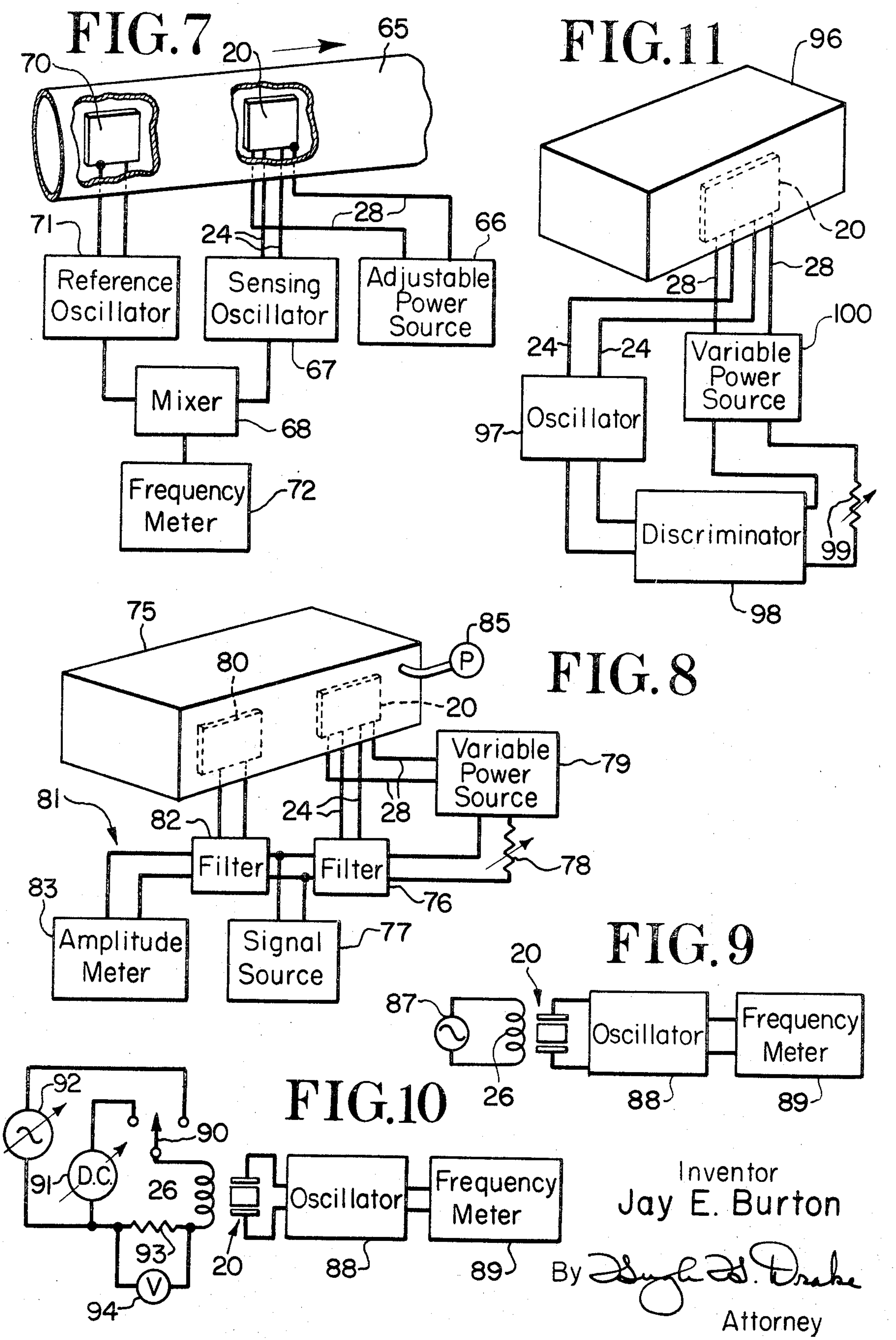
FIG. 7 is a perspective view, partially broken away, of a vessel within which a fluid medium flows combined with a block diagram of a system for measuring condition changes within the vessel.
FIG. 8 is a perspective view of another vessel within which a fluid exists combined with a block diagram of a measurements system for determining a condition state within the vessel.
FIG. 9 is a schematic diagram of another measurements system incorporating one of the devices of FIGS. 1 and 2.
FIG. 10 is a schematic diagram of still another measurements system incorporating one of the devices of FIGS. 1 and 2.
FIG. 11 is a perspective view of a container within which one of the devices of FIGS. 1 and 2 is disposed and which is combined, as shown in block diagram, with a measurements system.

It will be observed that, in both FIGS. 4 and 5, signals are translated between a signal device, in these cases either a filter or an oscillator, and leads coupled across the electrodes of the piezoelectric crystal unit. The signal device develops what may be termed a sensing signal and responds to changes in the temperature of body 21 for varying a parameter of that sensing signal in an amount proportional to the amount of change in the temperature. In the oscillator of FIG. 4, it is the frequency of the oscillatory signal which is changed, while in the filter of FIG. 5 the change is of the amplitude of the signal energy being translated through the filter. FIG. 7 represents one implementation of such a temperature-responsive signal device into a measurements system.

In FIG. 7, a vessel 65, illustrated to be in the form of a pipe, serves as a conduit for the flow of a fluid medium having a variable condition such as velocity. The particular fluid medium may be any of a wide variety; nitrogen gas is a typical example. Disposed within the fluid medium is crystal unit 20 (or unit 30) with its leads 28 coupling heater element 26 to an adjustable power source 66 and its leads 24 coupling its electrodes 22 to a sensing oscillator 67. Source 66 may supply either alternating or direct current to heater element 26. Oscillator 67 may be identical to the oscillator of FIG. 4 in which case its output terminals 48 are coupled to one input of a signal mixer 68. Spaced from piezoelectric unit 20 in the fluid medium within vessel 65 is another piezoelectric crystal unit 70. Unit 70 may be constructed in a manner identical to that of unit 20 (or unit 30) except for the omission of heater element 26 and its connecting leads. Whatever its actual construction, crystal unit 70 is chosen to exhibit the same temperature coefficient of selective-frequency change as that of crystal unit 20. Crystal unit 70 is coupled into the circuitry of a reference oscillator 71 so as to serve the latter as its primary frequency-determining element or component. Consequently, oscillator 71 may also be constructed in the manner shown in FIG. 4 so as to be controlled in frequency by the temperature of piezoelectric crystal unit 70. An output signal derived from the regeneration in oscillator 71 is fed to another input of mixer 68. A frequency meter 72 coupled to the output of mixer 68 developes an indication of the difference in frequency of the signals derived from oscillators 67 and 71 and fed to mixer 68.

Crystal unit 70 is located within vessel 65 so as to be essentially nonresponsive to heat developed in crystal unit 20 by its heater element 26. This situation is obtained by selecting the spacing between units 20 and 70 relative to the heat conductivity of the fluid medium such that heat from the heater element in unit 20 has an effect upon the temperature of the piezoelectric body of unit 70 less than that which changes in ambient temperature of the fluid medium have upon unit 70. This result is readily achieved in the apparatus of FIG. 7 by locating piezoelectric crystal unit 70 upstream from unit 20, as indicated by the arrow.

In operation, a selected constant value of power is supplied from source 66 to the heater element in crystal unit 20. As a condition of the fluid medium changes, the temperature of the piezoelectric body in unit 20 changes in proportion to the change in that condition in result of which there is a corresponding change in the frequency of the signal fed to mixer 68 by oscillator 67. Consequently, the difference between the frequencies of the signals from oscillators 67 and 71 changes and this result is directly indicated by frequency meter 72. On the other hand, the temperature of both crystal unit 20 and crystal unit 70 varies in proportion to the ambient temperature of the flowing fluid. Since both crystal units are chosen to have the same temperature coefficient, the effect of ambient temperature change is cancelled out in mixer 68 and, therefore, has no effect upon the indication given by meter 72.

The change in condition sensed by crystal unit 20 is a function of the heat transfer from the piezoelectric body in unit 20 to the flowing fluid. Consequently, with a constant direction of flow and a constant density of the fluid, the difference of temperature of crystal unit 20 which is sensed is a function of fluid velocity and the indication afforded by meter 72, therefore, may be calibrated directly in terms of velocity. On the other hand, again with a constant direction of flow but this time with a constant rate of flow or velocity, a change in temperature of unit 20 sensed by the system is a measure of the density of the fluid. In that case, frequency meter 72 is calibrated in terms of such change in density. In the case of those fluids in which a change of pressure results in a change in density, the indication of frequency meter 72 similarly can be calibrated in terms of pressure.

In another adaptation of the system of FIG. 7, frequency meter 72 is calibrated in terms of direction of flow since the amount of heat transfer from the piezoelectric body to the fluid is proportional to the orientation of the body with respect to the flow direction. That is, the amount of heat transfer is different when the fluid approaches a narrow end surface of crystal unit 20 as illustrated in FIG. 7 than when the crystal unit is rotated about a vertical axis by 90° so that the fluid impinges against a major surface area of the crystal unit. In still another analogous adaptation, the system of FIG. 7 may be used as a thermal conductivity cell.

As embodied herein, FIG. 7 utilizes crystal unit 20 to control the frequency difference between the respective oscillators; thus, the comparison from which the ultimate indication is derived is in terms of frequency. The same overall system approach may instead be utilized by instead employing frequency selective filters, such as the filter of FIG. 5, in which case the comparison to develop the ultimate indication is between the relative amplitudes of the signals derived from the two filter circuits which then replace the oscillators. Such use of filter circuitry instead of oscillator circuitry is illustrated in FIG. 8 which pertains to a different measurements system. Conversely, although FIG. 8 employs the filter approach, with amplitude detection, it may instead utilize oscillator circuitry and corresponding frequency detection or indication.

In the system of FIG. 8, a vessel 75 encloses a heat-conductive fluid medium having a condition variable in degree. Disposed within that medium is crystal unit 20 (or 30) having its leads 24, from its electrodes affixed to the piezoelectric body, coupled to the input of a filter 76. In this instance, filter 76 is of the kind shown in FIG. 5, and its input terminals are coupled to a source 77 of constant-frequency signals. While in operation the latter are generally of constant frequency, that frequency preferably is adjustable to enable matching of the signal frequency to the characteristics of the filter. The output signal from filter 76 is fed, preferably through an adjustable resistor 78, to a source 79 of variable power. The power from source 79 is supplied by leads 28 to the heating element affixed to the piezoelectric body in crystal unit 20.

Spaced in the fluid medium within vessel 75 from crystal unit 20 is a sensing unit 80 which responds to heat conducted through the fluid medium and received from crystal unit 20 for developing a control effect having a value proportional to changes in degree of the condition being measured. Coupled to sensing unit 80 is an indication system 81 which responds to changes in the value of that control effect and develops an indication proportional to the change in degree of the condition. While this sensing and indication system may take various forms, as herein embodied sensing unit 80 is identical to crystal unit 70 in the apparatus of FIG. 7. That is, it may be constructed like crystal units 20 and 30 of FIGS. 1 and 2 except that the heating element and its connecting leads are not used and may be omitted. However, in this case, in contrast to that of the apparatus of FIG. 7, the temperature coefficient of selective-frequency change of unit 80 need not be the same as that of the crystal unit coupled to filter 76.

In operation, crystal unit 20 heats sensing unit 80 by the transfer of heat through the fluid medium within vessel 76. Crystal unit 20 is maintained at a constant temperature through the action of the servo loop formed by filter 76 and power source 79. That is, as the temperature of crystal unit 20 tends to change, the response curve of filter 76 tend to shift with a resulting change in the amplitude of the signal from source 77 translated through filter 76. Upon the occurrence of an increment of change in amplitude of the output signal from filter 76, that increment of change is used as a control signal to vary the level of power from source 79, fed to the heater element in crystal unit 20, in a compensatory direction so as to cause the actual temperature of crystal unit 20 to be held constant. Variable resistor 78, in series with the control signal fed to power source 79, serves as a manual adjustment to permit initial selection of the temperature at which crystal 20 is to operate.

To indicate the desired responsive, crystal unit 80 is coupled to the input of a frequency selective filter 82 which as herein embodied is a circuit like that of FIG. 5, the same as filter 76. Source 77 feeds its signal also to the input of filter 82 from which the translated output signal is fed to an amplitude meter 83. Heat received by sensing unit 80 from crystal unit 20 causes a change in the frequency selective characteristic of unit 80 and this in turn shifts the response curve of filter 82. Consequently, the signal from source 77 translated through filter 82 and fed to meter 83 is changed in amplitude.

Particularly when the medium separating units 20 and 80 and vessel 76 is compressable, the heat transfer from unit 20 to unit 80 varies significantly with a change in fluid pressure. Therefore, by simply calibrating amplitude meter 83 for a given point of operation in terms of temperature of crystal unit 20, against a known standard of pressure, the apparatus of FIG. 8 serves as a very accurate and reliable pressure gage. Alternatively, the apparatus of FIG. 8 also serves as a density gage. The operation is the same except that calibration of meter 83 is in terms of changes in density of the fluid medium for a selected pressure. To enable observation of the latter, a pressure gage 85 communicates with the interior of vessel 75.

As still another adaptation into a measurements system of the directly-heated and self-heat-sensing crystal unit disolved, FIG. 9 illustrates a system useful for measuring power or true RMS voltage. With heater element 26 of crystal unit 20 (or 30) coupled to receive power from a source 87, the electrodes in the crystal unit are coupled to an oscillator 88 so that the crystal unit serves as the primary frequency determining element in the oscillator. Of course, oscillator 88 may be identical to the oscillator shown and described with respect to FIG. 4. The oscillatory signal energy is fed to a frequency meter 89.

In operation, a change in the level of power from source 87 causes a variation in the level of current flowing through heater element 26 and this in turn alters the frequency characteristic of crystal unit 20. Consequently, the frequency of oscillation in oscillator 88 is correspondingly changed and that change is monitored by frequency meter 89. Meter 89, therefore, is calibrated in terms of change of power. On the other hand, when the change of level in source 87 to be measured is that of voltage, frequency meter 89 is calibrated in terms of true RMS voltage, the operation of this system of FIG. 9 otherwise being the same.

FIG. 10 illustrates a system applicable to D.C.–A.C. transfer measurements and studies. Heating element 26, crystal unit 20, oscillator 88 and frequency meter 89 in this instance operate the same as described with respect to the system of FIG. 9. By means of a switch 90, however, heater element 26 is selectively coupled either to an adjustable direct-current source 91 or an adjustable alternating-current source 92. In either case, a resistor 93 is connected in series between heater element 26 and the selected source. Connected across resistor 93 in a voltmeter 94.

In typical operation, switch 90 is actuated to connect direct-current source 91 to heater element 26. The voltage level of source 91 is adjusted to provide a convenient level of voltage drop across the resistor as measured by meter 94. Power thus applied to heater element 26 causes heating of the piezoelectric body within crystal unit 20 which in turn shifts its frequency characteristic so as correspondingly to change the frequency of oscillation of oscillator 88 and hence the frequency of the signal monitored by frequency meter 89. After the system has stabilized, as noted by a constant reading of meter 89, the voltage drop across resistor 93 is noted by reading meter 94. Switch 90 is then actuated to remove source 91 and instead connect alternating-current source 92 across heater element 26. The alternating-current voltage level is then adjusted until, with the system having become stabilized, the frequency as measured by meter 89 is the same as that which existed under stabilization when direct current source 91 was utilized. Observation of voltmeter 94 reveals that the voltage drop across resistor 93 is the same as before, because the power dissipated and, therefore, the current through resistor 93 is the same in either the D.C. or the A.C. case. Thus, in actual practice the provision of resistor 93 and voltmeter 94 actually is unnecessary except as it may be used for calibration or testing purposes. All that is needed to insure accurate D.C. to A.C. transfer, or vice versa, is adjustable of the level of the second source switched into the circuitry to insure that the reading on meter 89 is the same as that which existed when the first source was connected.

The control characteristics of crystal unit 20 (or 30) may also advantageously be employed as adapted to the development of a proportionally controlled oven. Turning to FIG. 11, an enclosed oven 96 defines a chamber within which crystal unit 20 is disposed. Leads 24 from the electrodes, between which is sandwiched the piezoelectric body, are coupled to an oscillator 97 so that crystal unit 20 serves as the primary frequency-determining component of the oscillator. The signal energy developed by and derived from oscillator 97 is fed to a discriminator 98 which develops an output signal that is fed through an adjustable resistor 99 to a variable power source 100. Power from source 99 is supplied by leads 28 to heating element 26 in crystal unit 20.

In operation, crystal unit 20 serves as both the heater of the space within oven 96 and as the temperature-sensing element. The circuitry external to the oven chamber constitutes a servo loop serving to hold the oven temperature constant at a level set by adjustment of the value of resistor 99. As herein embodied, oscillator 97 is the same as that described with respect to FIG. 4, so that an incremental change in temperature within the oven alters the frequency characteristic of the piezoelectric body within unit 20 which in turn shifts the frequency of oscillation and hence the frequency or phase of the signal fed to discriminator 98. The output signal from discriminator 98 varies in amplitude in proportion to the change in frequency or phase of the signal fed to the discriminator from oscillator 97. Hence, variation in amplitude of the signal from the discriminator is likewise proportional to the change in temperature within oven 96. That change in amplitude of the discriminator-output signal is applied tc power source 100 as a control signal to change the power level supplied to the heater element in crystal unit 20 in a direction compensatory of the initial incremental change of temperature which, in effect, began the action of the servo loop. The resulting system is highly reliable and extremely fast acting by reason of the intimate physical relationship between the heating element and the piezoelectric body and the fact that the two together serve the dual function of heating and temperature sensing. While, as described, the servo system typically is of the conventional automatic-frequency-control loop variety, it also may follow the known principle of broad-band phase-locking.

As in the earlier observation that the systems approach using oscillators with monitoring of frequency in FIG. 7 could be substituted in FIG. 8 for the approach employing filters with monitoring of signal amplitude, and that likewise the filter approach could be used in place of the oscillators of FIG. 7, in each of the systems of FIGS. 9, 10 and 11 the system may employ filters and amplitude detection in place of the illustrated oscillators and frequency or phase detection. In addition, discriminator 98 in FIG. 11 may be omitted when the control input of power source 100 is chosen to respond directly to change in frequency or phase in order to vary the level of the power its source supplies.

The foregoing has disclosed a variety of systems and instrumentation for the making of an even wider variety of measurements. Yet, in each case the system actually employs but a very few stages and each of those can be of rather elemental and simple design. Consequently, each of the systems is capable of being packaged into a highly compact, rugged and small unit. Yet, extremely fast response, accuracy and reliability readily are obtained. At the same time, both initial cost and field-service requirements may be minimized.

While particular embodiments of the invention have been shown and described, it will be obvious to those skilled in the art that changes and modifications may be made without departing from the invention in its broader aspects, and, therefore, the aim in the appended claims is to cover all such all such changes and modifications as fall within the true spirit and scope of the invention.

I claim:

1. Heat-sensitive frequency-selective apparatus comprising:

a body of pyroelectric material selectively rsponsive to signals at frequencies within a predetermined freency range and exhibiting a predetermined temperature coefficient of selective-frequency change;

a pair of electrodes electrically affixed individually to respective spaced portions of said body;

a heating element disposed essentially in thermally-conductive contact with said body;

a signal device operative within said range to develop a sensing signal and respond to changes in the temperature of said body for varying a parameter of said sensing signal in an amount proportional to the amount of change in said temperature;

a power unit for delivering adjustable-level electrical power;

means coupled across said electrodes for translating said signals between said body and said signal device;

means coupled across said element for translating power to said element from said power unit while said signals are being translated between said body and said signal device;

and measurement means coupled to said signal device for exhibiting a response to variations in said parameter.

2. Apparatus as defined in claim 1 in which said heating element is secured in direct physical contact with said body.

3. Apparatus as defined in claim 1 in which said heating element is secured in direct physical contact with at least of one said electrodes, and said one electrode is secured in direct physical contact with said body.

4. Apparatus as defined in claim 1 in which said signal device is an oscillator regenerative at frequencies within said range with said body being the primary frequency-determining component of said oscillator.

5. Apparatus as defined in claim 4 in which said measurement means is coupled to said signal device for measuring the frequency of oscillation thereof.

6. Apparatus as defined in claim 4 in which said measurement means includes a discriminator coupled to and receptive of signal energy from said signal device for developing an output signal the amplitude of which is proportional to changes in at least one of the frequency and phase of oscillation in said device.

7. Apparatus as defined in claim 1 in which said signal device is a filter selective of signals at frequencies within said range with said body being the primary frequency-selective component of said filter.

8. Apparatus as defined in claim 7 in which said apparatus further includes a source of said signals feeding the same to the input of said signal device.

9. Apparatus as defined in claim 1 in which said measurement means is responsive to variations in said parameter for changing the power level fed from said unit to said element in proportion to changes in said parameter.

10. Apparatus as defined in claim 9 in which said measurement means maintains said power at a level sustaining the temperature of said body at a selectively-adjustable constant value.

11. Apparatus as defined in claim 10 in which said apparatus further includes means defining a chamber and said body is disposed within said chamber.

12. Apparatus as defined in claim 10 in which said apparatus further includes:

a vessel within which exists a heat-conductive fiuid medium having a condition variable in degree, said body being disposed in said medium;

sensing means spaced in said medium from said body and responsive to heat received from said body for developing a control effect having a value proportional to changes in degree of said condition; and indication means coupled to said sensing means and responsive to changes in the value of said control effect for developing an indication proportional to the change in degree of said condition.

13. Apparatus as defined in claim 12 in which said sensing means is a second body of pyroelectric material selectively responsive to signals at frequencies within a predeermined frequency range and exhibiting a predetermined temperature coefficient of selective-frequency change, with a second pair of electrodes electrically affixed individually to respective spaced portions of said second body, and across which second pair of electrodes is coupled a second signal device that develops a second sensing signal and responds to changes in the temperature of said second body for varying a parameter of said second sensing signal in an amount proportional to the amount of change in the temperature of said second body.

14. Apparatus as defined in claim 13 which further includes means for measuring the pressure of said fluid medium.

15. Apparatus as defined in claim 1 in which said apparatus further includes:

a vessel within which flows a fluid medium having a variable condition, said body being disposed in said medium;

a second body of pyroelectric material, selectively responsive to signals at frequencies within a predetermined frequency range and exhibiting said predetermined temperature coefficient of selecive-frequency change, spaced in said medium from the first body, the spacing between said bodies being selected relative to the heat conductivity of said medium such that heat from said element has an effect upon the temperature of said second body less than that of changes in ambient temperature of said medium;

a second pair of electrodes electrically affixed individually to respective spaced portions of said second body;

a second signal device coupled across said second pair of electrodes for developing a second sensing signal and responsive to changes in the temperature of said second body for varying a parameter of said second sensing signal in an amount proportional to the temperature change of said second body; and means for comparing said first and second sensing signals to develop an indication proportional to the change in state of said condition.

16. Apparatus as defined in claim 1 in which said measurement means responds to changes in said parameter for developing an indication proportional to changes in the level of said power.

17. Apparatus as defined in claim 1 in which said power unit is a source of variable RMS voltage applied to said element and said measurement means responds to changes in said parameter for developing an indication proportional to the changes in the level of said RMS voltage.

18. Apparatus as defined in claim 1 in which said power unit is an adjustable-level source selective of either one of alternating current and direct current for said element and said apparatus further includes:

indication means included in said measurement means and responsive to change in said parameter for developing an indication proportional to the changes in the level of current from said power unit; and a resistor connected in series between said power unit and said heating element together with means coupled across said resistor for indicating the voltage drop thereacross.

References Cited

UNITED STATES PATENTS

| | | | |
|---|---|---|---|
| 1,894,687 | 1/1933 | Hyland | 324—56 |
| 2,364,501 | 12/1944 | Wolfskill | 324—56 X |
| 2,571,171 | 10/1951 | Van Dyke | 331—66 X |
| 2,789,281 | 4/1957 | Short et al. | 340—234 |
| 2,975,261 | 3/1961 | Keen et al. | 219—210 |
| 3,054,951 | 9/1962 | Richard | 324—106 |
| 3,329,004 | 7/1967 | King | 73—23 |
| 3,355,949 | 12/1967 | Elwood et al. | 73—362 X |

EDWARD E. KUBASIEWICZ, Primary Examiner

U.S. Cl. X.R.

73—204, 362; 219—210; 310—8.1, 8.9, 9.1; 331—66